US011132698B1

(12) United States Patent
Lanza et al.

(10) Patent No.: US 11,132,698 B1
(45) Date of Patent: Sep. 28, 2021

(54) SYSTEM AND METHODS FOR GENERAL LEDGER FLAGGING

(71) Applicant: GRANT THORNTON LLP, Chicago, IL (US)

(72) Inventors: Richard Lanza, Chicago, IL (US); Brian Wolohan, Chicago, IL (US); Matthew Van Buren, Chicago, IL (US)

(73) Assignee: Grant Thornton LLP, Chicago, IL (US)

(*) Notice: Subject to any disclaimer, the term of this patent is extended or adjusted under 35 U.S.C. 154(b) by 0 days.

(21) Appl. No.: 17/226,971

(22) Filed: Apr. 9, 2021

Related U.S. Application Data

(60) Provisional application No. 63/008,435, filed on Apr. 10, 2020, provisional application No. 63/008,449, filed on Apr. 10, 2020, provisional application No. 63/008,460, filed on Apr. 10, 2020.

(51) Int. Cl.
*G06Q 30/00* (2012.01)
*G06F 16/28* (2019.01)

(52) U.S. Cl.
CPC ....... *G06Q 30/0185* (2013.01); *G06F 16/285* (2019.01)

(58) Field of Classification Search
CPC .......................... G06Q 30/0185; G06F 16/285
See application file for complete search history.

(56) References Cited

U.S. PATENT DOCUMENTS

| | | | |
|---|---|---|---|
| 7,136,876 B1 | 11/2006 | Adar et al. | |
| 7,263,527 B1 | 8/2007 | Malcolm | |
| 7,539,634 B2 | 5/2009 | Goodbody et al. | |
| 7,590,658 B2 | 9/2009 | Bahl et al. | |
| 7,788,146 B2 | 8/2010 | McCarthy, Jr. | |
| 8,121,913 B2 | 2/2012 | Bracken et al. | |
| 8,316,007 B2 | 11/2012 | Liao | |
| 8,364,470 B2 | 1/2013 | Abraham et al. | |
| 8,473,354 B2 | 6/2013 | Psota et al. | |

(Continued)

OTHER PUBLICATIONS

Lanza et al. (A Risk-Based Approach to Journal Entry Testing, 2007, 7 pages) (Year: 2007).*

(Continued)

*Primary Examiner* — Oleg Korsak

(74) *Attorney, Agent, or Firm* — Faegre Drinker Biddle & Reath LLP

(57) ABSTRACT

A method for flagging journal entries within a general ledger is described. A plurality of assessment routines are executed on transaction lines of the journal entries within the general ledger, each assessment routine of the plurality of assessment routines i) being configured to generate a base score for each transaction line, and ii) associated with a corresponding flagging threshold. A composite score is generated for each transaction line using the base scores generated by the plurality of assessment routines. For each journal entry within the general ledger: the journal entry is flagged when one or more base scores for the journal entry exceed the corresponding flagging thresholds of the assessment routines, or when none of the base scores for the journal entry exceed the corresponding flagging thresholds and the composite score exceeds a composite threshold. A report of flagged journal entries is generated.

20 Claims, 14 Drawing Sheets

(56) References Cited

U.S. PATENT DOCUMENTS

| | | |
|---|---|---|
| 8,572,072 B1 | 10/2013 | Roumeliotis |
| 8,712,813 B2 | 4/2014 | King |
| 9,015,301 B2 | 4/2015 | Redlich et al. |
| 9,922,015 B2 | 3/2018 | Anders et al. |
| 10,115,108 B1 | 10/2018 | Gendelev et al. |
| 10,121,115 B2 | 11/2018 | Chrapko |
| 10,140,272 B2 | 11/2018 | Bao et al. |
| 10,290,001 B2 | 5/2019 | Adjaoute |
| 10,332,109 B2 | 6/2019 | Ghatage et al. |
| 10,366,461 B2 | 7/2019 | Edmund et al. |
| 2002/0138371 A1 | 9/2002 | Lawrence et al. |
| 2004/0111342 A1 | 6/2004 | Wang |
| 2005/0222928 A1 | 10/2005 | Steier et al. |
| 2008/0033714 A1 | 2/2008 | Gupta |
| 2009/0024536 A1 | 1/2009 | Archer et al. |
| 2016/0078352 A1 | 3/2016 | Pallath |
| 2016/0171398 A1 | 6/2016 | Eder |
| 2019/0130403 A1 | 5/2019 | Merz et al. |
| 2019/0228419 A1 | 7/2019 | Sampath |
| 2020/0073940 A1 | 3/2020 | Grosset et al. |

OTHER PUBLICATIONS

West et al. (Intelligent financial fraud detection: A comprehensive review, C&S, 2016, 47-66) (Year: 2015).*

Bhattacharyya et al. (Data mining for credit card fraud: A comparative study, Decision Support Systems 50 (2011) 602-613) (Year: 2010).*

Debreceny et al. (Data mining journal entries for fraud detection: An exploratory study, International Journal of Accounting Information Systems 11 (2010) 157-181) (Year: 2010).*

Seow et al. (Data mining journal entries for fraud detection: A replication of Debreceny and Gray's (2010) techniques. (2016). Journal of Forensic and Investigative Accounting. 8, (3), 501-514.) (Year: 2016).*

Basel Committee on Banking Supervision (The Joint Forum Trends in risk integration and aggregation, 2003, 47 pages) (Year: 2003).*

Grove et al. (Lessons for Auditors, 2004 pp. 131-146) (Year: 2004).*

Daniel (Auditor Judgments: A Descriptive Study of the Assessment of Audit Risk, Thesis, 1985, 139 pages) (Year: 1985).*

Horakova et al., "Business Intelligence and Implementation in a Small Enterprise," Journal of Systems Integration, Apr. 24, 2013, vol. 2(4), pp. 50-61.

Lanza, "Pinpointing Textual Change Swiftly Using Letter Analytics. Defining the Lanza Approach to Letter Analytics ("LALA")," Research Brief, International Institute for Analytics, Sep. 2015-Feb. 2016, 10 pages.

Larkey et al., "Acrophile: An Automated Acronym Extractor and Server," Proceedings of 5th ACM Conference on Digital Libraries, Jun. 1, 2000, pp. 205-214.

Loughran et al., "Textual Analysis in Accounting and Finance: A Survey," Journal of Accounting Research, vol. 54 (4), Sep. 2016, pp. 1187-1230.

Muller-Wickop et al., "Conceptual Model of Accounts. Closing the Gap between Financial Statements and Business Process Modeling," Modellierung, Niels Muller-Wickop, Marku Nuttgens, 2014, pp. 209-223.

Schreyer et al., "Detection of Anomalies in Large-Scale Accounting Data using Deep Autoencoder Networks," arXiv: preprint arXiv: 1709.05254, Sep. 15, 2027, retrieved from Internet at <https://arxiv.org/pdf/1709.05254.pdf>, pp. 1-19.

Schuliz et al., "Autoencoder Neural Networks versus External Auditors: Detecting Unusual Journal Entries in Financial Statement Audits," Proceedings of 53rd Hawaii International Conference on System Sciences, 2020, pp. 5421-5430.

Sharma et al., "A Review of Financial Accounting Fraud Detection based on Data Mining Techniques," International Journal of Computer Applications, Feb. 2012, vol. 39(1), pp. 37-47.

Wikipedia, "Benford's Law," Wikipedia.org, retrieved from Internet at <https://en.wikipedia.org/w/index.php?title-Benford%27s_law&oldid-1016528486> on Apr. 7, 2021, 16 pages.

Yeates et al., "Using compression to identify acronyms in text," arXiv preprint cs/0007003, retrieved from Internet at <https://arxiv.org/pdf/cs/0007003.pdf>, Jul. 4, 2000, pp. 1-11.

\* cited by examiner

| JOURNAL ENTRY # | Total JE Debit | Total JE Credit | Reference | Transaction Date | Posting Date | Account Number | Account Description | Line Debit | Line Credit | User |
|---|---|---|---|---|---|---|---|---|---|---|
| 1002 | 5000 | 5000 | Bi-Monthly Trx | May-01-2017 | May-05-2017 | 1001001 | Bank One | $5,000.00 | $0.00 | BJF |
| 1002 | 5000 | 5000 | Bi-Monthly Trx | May-01-2017 | May-05-2017 | 2002002 | Bank Two | $0.00 | $5,000.00 | BJF |
| 1003 | 13000 | 13000 | Payables Trx | May-05-2017 | May-15-2017 | 3003003 | Accounts Receivable | $12,000.00 | $0.00 | MSK |
| 1003 | 13000 | 13000 | Payables Trx | May-05-2017 | May-15-2017 | 4004004 | Accounts Payable | $0.00 | $13,000.00 | MSK |
| 1003 | 13000 | 13000 | Payables Trx | May-05-2017 | May-15-2017 | 5005005 | Credit Account | $1,000.00 | $0.00 | MSK |
| 1004 | 5000 | 5000 | Bi-Monthly Trx | May-15-2017 | May-16-2017 | 1001001 | Bank One | $5,000.00 | $0.00 | CMH |
| 1004 | 5000 | 5000 | Bi-Monthly Trx | May-15-2017 | May-16-2017 | 2002002 | Bank Two | $0.00 | $5,000.00 | CMH |
| 1005 | 999.99 | 999.99 | Elec. Check | May-17-2017 | May-15-2017 | 3003003 | Accounts Receivable | $999.99 | $0.00 | MSK |
| 1005 | 999.99 | 999.99 | Elec. Check | May-17-2017 | May-15-2017 | 6006006 | MSK Direct Deposit | $0.00 | $999.99 | MSK |

FIG. 3

The top 20 combinations account for 86% of JE line items

| | Journal lines | % of total |
|---|---|---|
| Total journal entry lines | 1,558,112 | 100% |
| Line items with zero income statement impack | 136,930 | 9% |
| Top 20 account combinations | 1,338,811 | 86% |
| Remaining 322 account combinations | 82,371 | 5% |

Top combination:

| TOTAL_JE_TRANS | GL_AccountDR1 | GL_AccountCr1 |
|---|---|---|
| 927,956 | COGS | Inventory |

| JOURNAL ENTRY # | Account 1 | Debit 1 | Credit 1 | Account 2 | Debit 2 | Credit 2 | Account 3 | Debit 3 | Credit 3 |
|---|---|---|---|---|---|---|---|---|---|
| 1002 | 1001001 | $5,000.00 | $0.00 | 2002002 | $0.00 | $5,000.00 | | $0.00 | $0.00 |
| 1003 | 3003003 | $12,000.00 | $0.00 | 4004004 | $0.00 | $13,000.00 | 5005005 | $1,000.00 | $0.00 |
| 1004 | 1001001 | $5,000.00 | $0.00 | 2002002 | $0.00 | $5,000.00 | | $0.00 | $0.00 |
| 1005 | 3003003 | $999.99 | $0.00 | 6006006 | $0.00 | $999.99 | | $0.00 | $0.00 |

1100

| JOURNAL ENTRY # | AR1 | AR2 | AR3 | AR4 | Composite Score | Journal Entry Total |
|---|---|---|---|---|---|---|
| 1002 | 0 | 0 | 0 | 0 | 0 | 0 |
| 1002 | 0 | 0 | 0 | 0 | 0 | 0 |
| 1003 | 1 | 0 | 1 | 1 | 3 | 6 |
| 1003 | 1 | 0 | 0 | 0 | 1 | 6 |
| 1003 | 0 | 1 | 0 | 1 | 2 | 6 |
| 1004 | 0 | 0 | 0 | 0 | 0 | 0 |
| 1004 | 0 | 1 | 0 | 0 | 0 | 0 |
| 1005 | 1 | 0 | 1 | 1 | 4 | 5 |
| 1005 | 1 | 0 | 0 | 0 | 1 | 5 |

| JOURNAL ENTRY # | Account 1 | Account 2 | Account 3 | AR1 Base | AR2 Base | AR3 Base | AR4 Base | Journal Entry Total | Line Items | Score Ratio |
|---|---|---|---|---|---|---|---|---|---|---|
| 1002 | 1001001 | 2002002 | | 0 | 0 | 0 | 0 | 0 | 2 | 0.00 |
| 1003 | 3003003 | 4004004 | 5005005 | 2 | 1 | 1 | 2 | 6 | 3 | 0.50 |
| 1004 | 1001001 | 2002002 | | 0 | 0 | 0 | 0 | 0 | 2 | 0.00 |
| 1005 | 3003003 | 6006006 | | 2 | 1 | 1 | 1 | 5 | 2 | 0.63 |

FIG. 12

SYSTEM AND METHODS FOR GENERAL LEDGER FLAGGING

CROSS-REFERENCES TO RELATED APPLICATIONS

This disclosure claims the benefit of U.S. Provisional Patent Application No. 63/008,435, entitled "System and Method for Performing Data Analytics" and filed on Apr. 10, 2020, U.S. Provisional Patent Application No. 63/008,449, entitled "System and Method for Performing Data Analytics" and filed on Apr. 10, 2020, and U.S. Provisional Patent Application No. 63/008,460, entitled "System and Method for Performing Data Analytics" and filed on Apr. 10, 2020, the disclosures of each of which are incorporated herein by reference in their entireties.

FIELD OF THE DISCLOSURE

The present disclosure relates generally to general ledger analysis and, more particularly, to flagging journal entries within a general ledger.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A general ledger is a bookkeeping ledger that provides a collection of accounting information for a company, store, business, or other suitable entity. The general ledger may be used to track flows of money among several different categories, for example, accounts payable, accounts receivable, cash management, fixed assets, purchasing, etc. and identify a source of funds for a transaction, a destination of the funds, an identity of an individual or group that initiated and/or approved the transaction, and other characteristics or data associated with the transaction. As a business becomes larger and more complex over a period of years, the general ledger may expand to tens of thousands of lines and become difficult to manage. When analyzing a large general ledger to check for instances of mistake, fraud, or other irregularities, only a sub-portion of the general ledger could be historically analyzed due to constraints on time, audit personnel, or capabilities of computers that assist in the audit. However, analyzing only a sub-portion of a general ledger cannot identify all instances of irregularity, especially when an employee with access to the general ledger carries out an act of fraud (e.g., embezzlement) and takes efforts to conceal their actions. Although some audit systems may utilize many procedures that identify different risk factors associated with fraud, sophisticated offenders that have knowledge of the procedures may be able to modify their actions to conceal them from discovery.

SUMMARY

In an embodiment, a method for flagging journal entries within a general ledger comprises: executing a plurality of assessment routines on transaction lines of the journal entries within the general ledger, each assessment routine of the plurality of assessment routines i) being configured to generate a base score for each transaction line, and ii) associated with a corresponding flagging threshold; generating, for each transaction line, a composite score using the base scores generated by the plurality of assessment routines. The method also includes, for each journal entry within the general ledger: flagging the journal entry when one or more base scores for the journal entry exceed the corresponding flagging thresholds of the assessment routines; and flagging the journal entry when none of the base scores for the journal entry exceed the corresponding flagging thresholds and the composite score exceeds a composite threshold. The method further includes generating a report of flagged journal entries, including at least one flagged journal entry where none of the base scores for the at least one flagged journal entry exceed the corresponding flagging thresholds and the composite score exceeds the composite threshold.

In another embodiment, a system includes at least one processor, and at least one memory storing computer-executable instructions that when executed by the at least one processor cause the system to perform a method. The method includes executing a plurality of assessment routines on transaction lines of the journal entries within the general ledger, each assessment routine of the plurality of assessment routines i) being configured to generate a base score for each transaction line, and ii) associated with a corresponding flagging threshold; generating, for each transaction line, a composite score using the base scores generated by the plurality of assessment routines. The method also includes, for each journal entry within the general ledger: flagging the journal entry when one or more base scores for the journal entry exceed the corresponding flagging thresholds of the assessment routines; and flagging the journal entry when none of the base scores for the journal entry exceed the corresponding flagging thresholds and the composite score exceeds a composite threshold. The method further includes generating a report of flagged journal entries, including at least one flagged journal entry where none of the base scores for the at least one flagged journal entry exceed the corresponding flagging thresholds and the composite score exceeds the composite threshold.

BRIEF DESCRIPTION OF THE DRAWINGS

FIG. 3 is a diagram of an example portion of a general ledger, according to an embodiment.

FIG. 6 is a diagram of an example user interface for general ledger analysis using account combinations, according to an embodiment.

FIG. 11 depicts example tables illustrating features of the method of FIG. 10, using the general ledger of FIG. 3 as example source material.

FIG. 12 depicts an example table illustrating features of the method of FIG. 10, using the general ledger of FIG. 3 as example source material.

DETAILED DESCRIPTION

Various embodiments described herein provide a system and method for performing data analytics, for example, in the context of a business audit, business procedure review, controls advisory, due diligence, merger and acquisition review, tax review, or other suitable scenario for review and analysis of a general ledger or financial records. At least some of the embodiments enable a user (i.e., an employee, manager, or third party auditor) to gain financial insights across a business organization and to focus the analytical efforts on providing a holistic view of the business. In some scenarios, the data analytics improve the accuracy of risk assessments and identify higher risk transactions and trends not just based on the numbers, dollar amounts, or raw "risk scores" associated with transactions in a general ledger, but also the words used to describe the transactions, the relationships among the transactions, and the prior history of transactions for the business. In some scenarios, the data analytics provide a composite risk score and provide visualizations of general ledger transactions to identify transactions with unusual or high risk characteristics and a material impact on financial statements. In some scenarios, the data analytics compress transactions recorded within a given year into unique combinations allowing for quick insight into unusual transactions with significant financial statement impact and views to confirm the consistency of financial reporting.

Some auditing standards require an auditing team to perform procedures in response to risks of material misstatement due to fraud, and in particular, the presumed risk of management override of controls. Journal entry testing for a general ledger may be performed in response to the presumed fraud risk related to management override of controls, irrespective of the risk assessment. The data analytics procedures described herein provide an approach used to respond to this presumed fraud risk.

Figure 1:
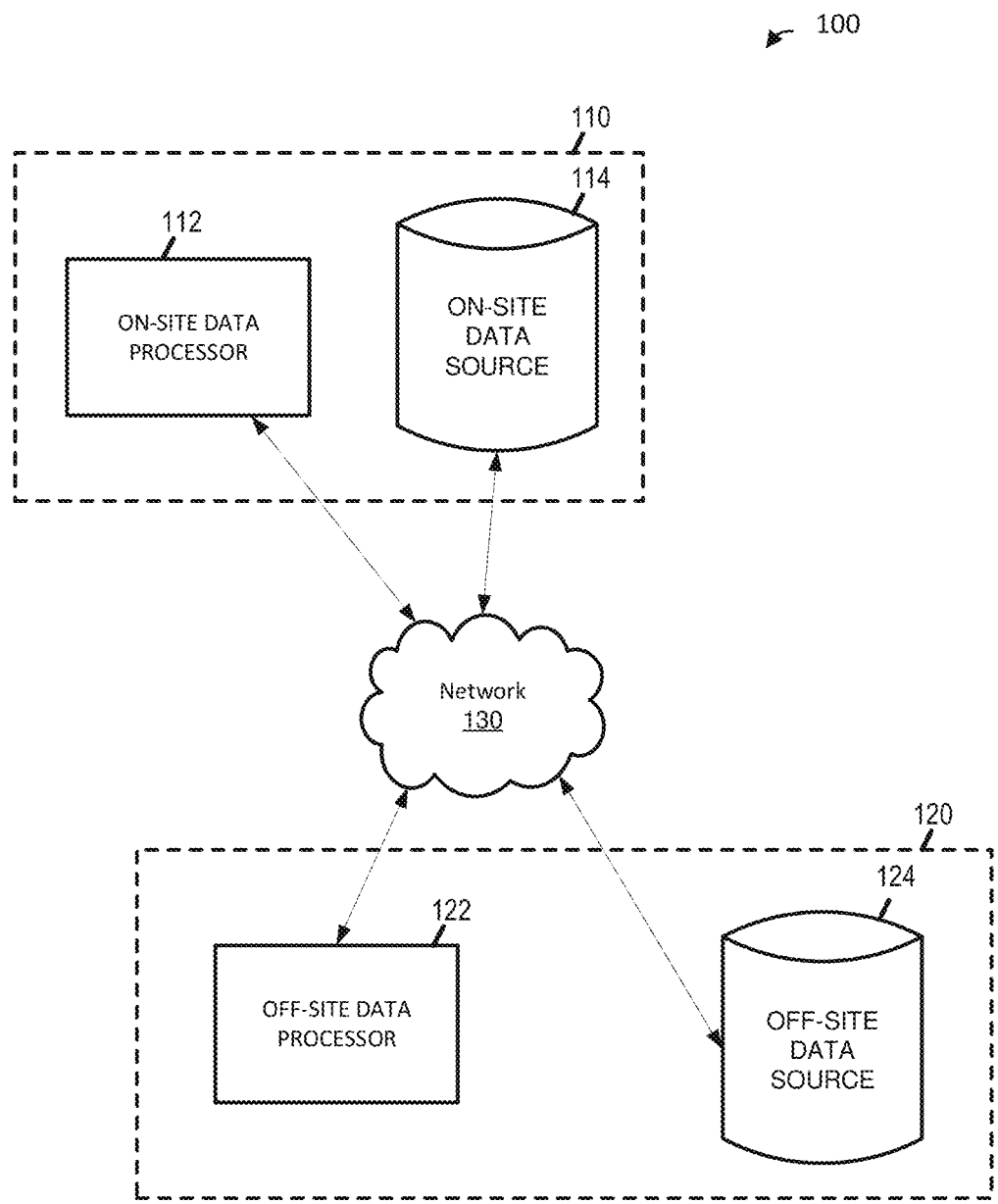
FIG. 1 is a block diagram of an example data analytics system configured to perform data analytics, according to an embodiment.

FIG. 1 is a block diagram of an example data analytics system 100 configured to perform data analytics, according to an embodiment. The data analytics, in some scenarios, includes analysis of a general ledger for a business. A general ledger is a system of account information that may be used to prepare reports including financial statements, business reports, audit reports, marketing reports, etc. for the business. When the business performs a transaction such as paying an invoice, receiving and processing a wire transfer, etc., suitable transaction data is stored and may be categorized by type into separate accounts for assets, liabilities, equity, revenues, expenses, or other suitable categories. Although the description herein is focused on a business, this is merely an example and in other embodiments, the business is a university, non-profit organization, governmental institution, or other suitable organization.

The data analytics system 100, in various embodiments and/or scenarios, is configured to utilize one or more of on-site resources 110 and off-site resources 120, communicatively coupled by a communication network 130. The communication network 130 may be a wide area network (WAN) such as the Internet, a local area network (LAN), or any other suitable type of communication network. In some embodiments, the communication network 130 may be a single communication network or may be made up of multiple different communication networks (e.g., two or more LANs that are joined by the Internet).

A business may store its general ledger electronically within an on-site data source 114 and utilize general ledger software with an on-site data processor 112 to manage the general ledger. Examples of an on-site data processor 112 include personal computers, network servers, server clusters, or other suitable processors that may be located at the business and utilized, at least in part, for processing data and generating reports. In some scenarios, analysis of the general ledger is performed as part of an audit of the business, which may be performed by the business itself or by a third party auditor. Examples of the on-site data source 114 include electronic documents (e.g., Word or text documents, spreadsheets, slides, etc.), databases (e.g., Oracle, mySQL, DB2, etc.), application programming interfaces to proprietary software (e.g., general ledger software), or other suitable data sources. In some scenarios, the electronic documents are originally created as paper or hard-copy documents by a user (i.e., raw data) and are processed to be included in an electronic document, for example, by scanning, optical character recognition by a processor (e.g., processor 112 or 122), or a separate user that manually enters the data contained within the paper document. In some embodiments, one or more on-site data processors 112 and/or on-site data sources 114 are managed or provided by a third party auditor, but located on the premises of the business.

In some embodiments, a business may utilize a third party host that provides the off-site resources 120, including, for example, one or more off-site data processors 122 and one or more off-site data sources 124. Although the off-site resources 120 may also be utilized, at least in part, for processing data and generating a report, the off-site resources 120 are generally managed by the third party host, or several different third party hosts. Examples of the off-site data source 124 include Amazon Relational Database Service, Drop Box, Google Drive, remote data backup services, or an application programming interface (API) to a data source, such as Salesforce or Facebook. Examples of an off-site data processor 122 include personal computers, network servers, server clusters, cloud processors, distributed computing systems (e.g., Amazon Web Services, Azure Data Factory), or other suitable processors that are located remotely from the business.

In some embodiments, the third party host of at least some of the off-site resources 120 is also the third party auditor. In other words, the third party auditor provides off-site hosting of data that will be used for generating an audit report, off-site processing of data that will be used for generating the audit report, or both off-site hosting and off-site processing. As one example, a small business may rely on the third party auditor to host and process data to be used for an audit so that the business does not need to pay for potentially large amounts of data storage and processing power. As another example, a small business may rely on the third party auditor to perform processing of the data, but use its own data sources.

Figure 2:
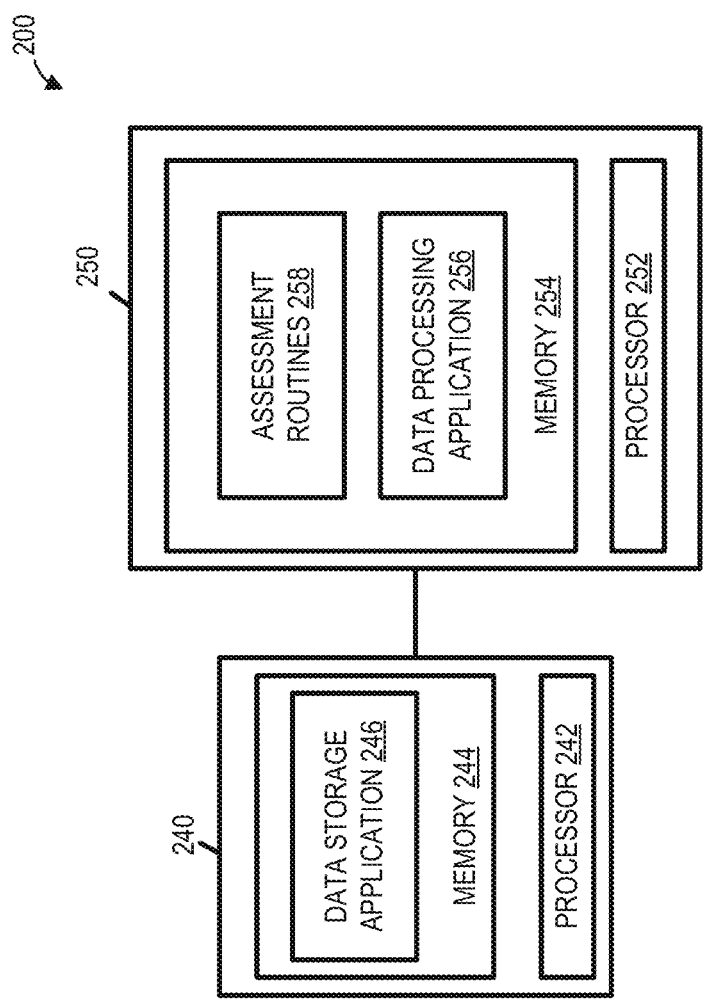
FIG. 2 is a block diagram of another example data analytics system, according to an embodiment.

FIG. 2 is a block diagram of another example data analytics system 200 that includes a data source 240 and a data analytics processor 250, according to an embodiment. In some examples, the data source 240 and the data analytics processor 250 generally correspond to the on-site data source 114 and on-site data processor 112 of FIG. 1, respectively, according to an embodiment. In the embodiment shown in FIG. 2, the data source 240 provides data (i.e., raw data or processed, structured data) to the data analytics processor 250.

The data source 240 may include a processor 242 and a computer-readable memory 244 that stores a data storage application 246 in the form of computer-readable instructions, for example, that may be executable by the processor 242. Computer readable memory 244 may include volatile memory to store computer instructions and data on which the computer instructions operate at runtime (e.g., Random Access Memory or RAM) and, in an embodiment, persistent memory such as a solid state drive or disk drive, for example.

The data source 240 (via execution of the data storage application 246) is configured to store data in the memory 244 until the data is processed by the data analytics processor 250 for generation of an audit report or data processing summary, as described herein. The data analytics function processor 250 includes a plurality of assessment routines 258 that are configured to process the data to flag journal entries within a general ledger. Flagged journal entries may then be analyzed by an auditor or financial advisor during an audit or other review of the general ledger. In various embodiments, the assessment routines 258 are software functions, routines, or executable files that process data and provide a suitable output. Additional processing steps performed by the data source 240 may include data conversion or transformation routines, optical character recognition routines, sorting routines, filtering routines, or other suitable processing.

In some embodiments, the data source 240 is configured to receive data from the on-site data source 114 or off-site data source 124 and store that data as "structured" data for subsequent processing by the data analytics function processor 250 and generation of the audit report. In various embodiments, the data source 240 is implemented by the on-site data source 114, by the off-site data source 124, or both the on-site data source 114 and the off-site data source 124, for example, as a portion of an electronic document, one or more tables in a database, a portion or partition of a disk drive, or other suitable data storage device. In some embodiments, the data source 240 also stores the structured data for backup and recovery purposes, follow-up audits, or other suitable purposes. In other embodiments, the data source 240 is a cloud-based data storage and processing system, for example, Azure data storage and Azure Data Factory.

The data analytics function processor 250 may include a processor 252 and a computer-readable memory 254 that stores a data processing application 256 and the plurality of assessment routines 258 in the form of computer-readable instructions, for example, that may be executable by the processor 252. Computer readable memory 254 may include volatile memory to store computer instructions and data on which the computer instructions operate at runtime (e.g., Random Access Memory or RAM) and, in an embodiment, persistent memory such as a solid state drive or disk drive, for example. In some embodiments, the data analytics function processor 250 is managed or provided by a third party auditor, but located on the premises of the business. In other embodiments, the data analytics function processor 250 is managed or provided by the third party auditor and located off the premises of the business, for example, as a cloud-based service.

When the general ledger of a business has expanded to tens of thousands of lines or more across many different accounts, determining whether irregularities are present is challenging. In various embodiments described herein, the processor 250 is configured to utilize several techniques for identifying and "flagging" particular journal entries, or transaction lines that make up the journal entries, as having a risk level that exceeds various thresholds. In other words, transaction lines or journal entries that may have an increased risk of fraud or other irregularities are flagged for further analysis by a user or auditor. Advantageously, the assessment routines 258 may be performed on each transaction line of a general ledger, as opposed to merely a subset of transaction lines.

In various embodiments, the assessment routines 258 are configured to analyze a journal entry and its transaction lines and generate a base score that indicates a relative level of risk. When the base scores for an assessment routine exceeds a flagging threshold, the processor 252 flags the journal entry. Accordingly, the assessment routines 258 correspond to respective flagging thresholds. In some embodiments, the base score is binary (i.e., 1 or 0) and indicates whether the assessment routine identified a risk (1) or did not (0), with a flagging threshold of 1. In other embodiments, the base score is an integer (e.g., on a scale of 0 for no risk to 10 for high risk with a flagging threshold of 6, 7, etc.) or floating point number (e.g., 0.0 for no risk, 0.5 for moderate risk, 1.0 for high risk, with a flagging threshold of 0.75, 0.8, etc.).

In addition to the base scores provided by the assessment routines 258, the processor 252 is also configured to generate composite scores and score ratios using the base scores. As an example, the processor 252 may take a summation of the base scores, a weighted summation of the base scores, or other suitable combination to determine a composite score for a transaction line. As another example, the processor 252 may take a summation of base scores for an entire journal entry as a journal entry total. As yet another example, the processor 252 may take a summation of the base scores for an assessment routine over the transaction lines of a journal entry (e.g., a journal entry having five lines may have a composite score of three when three of those lines "trigger" the assessment routine). The processor 252 is configured to flag a journal entry when the composite score exceeds a composite threshold. Advantageously, this approach allows for journal entries that do not reach the flagging thresholds of the assessment routines 258 individually to be flagged when the base scores in aggregate indicate that the journal entry should be further analyzed by an auditor. In other words, journal entries that in previous solutions were not analyzed due to having only apparent "low risk" scores may now be flagged for analysis when a significant number of low risk scores suggest a higher level of risk.

FIG. 3 is a diagram of an example portion of a general ledger 300, according to an embodiment. The general ledger 300 is implemented as a database having columns for a journal entry number 302 as a unique identifier for a journal entry, values for a debit 304 and a credit 306 associated with the journal entry indicating whether money is incoming or outgoing, and a reference 308 that indicates a description for the journal entry (e.g., entered by a user when creating the entry). The general ledger 300 also includes transaction dates 310 that indicate a date on which a transaction actually occurred, posting dates 312 that indicate when a transaction was posted to an account (e.g., when a transaction occurred on a weekend or holiday and was posted on a next business day), account numbers 314 and account descriptions 316 that indicate where a credit originated or debit was received, a debit amount 318 or credit amount 320 for the transaction, and a user 322 who approved the transaction. Although several example columns for the general ledger 300 have been described, other columns, fields, or values may be utilized, in addition to or instead of these columns, in other embodiments.

The general ledger 300 includes four journal entries corresponding to journal entry numbers 1002, 1003, 1004, and 1005. Journal entry 1002 contains two transaction lines that indicate a debit of $5,000 from an account associated with Bank One and a corresponding credit of $5,000 to an account associated with Bank Two for a bi-monthly transaction ("Bi-Monthly Trx"), for example. A similar entry appears for journal entry 1004. Journal entry 1003 contains three transaction lines and indicates a 3-part transaction of two debits (to Accounts Receivable and Credit Account) and one debit (to Accounts Payable), for example.

Journal entry 1005 contains a debit from the Accounts Receivable account and a corresponding credit to MSK Direct Deposit for $999.99. In some embodiments, at least some of the plurality of assessment routines are configured to flag the journal entry 1005 for various characteristics that may indicate fraud or other irregularities. For example, one assessment routine may flag the journal entry 1005 because it is for an amount that is just under $1,000.00, which may be an amount that is more likely to be noticed in an audit (e.g., for a "large transaction level" threshold). Another assessment routine may flag the journal entry 1005 because it has a transaction date ("Sep. 17, 2017") that is after the posting date ("May 15, 2017"), which may indicate that it was entered retroactively (e.g., in a prior reporting quarter). Yet another assessment routine may flag the journal entry 1005 because the accounts receivable account has been used in a manner inconsistent with prior transactions (i.e., the debit for journal entry 1003 was credited to accounts payable, not a direct deposit account).

Figure 4:
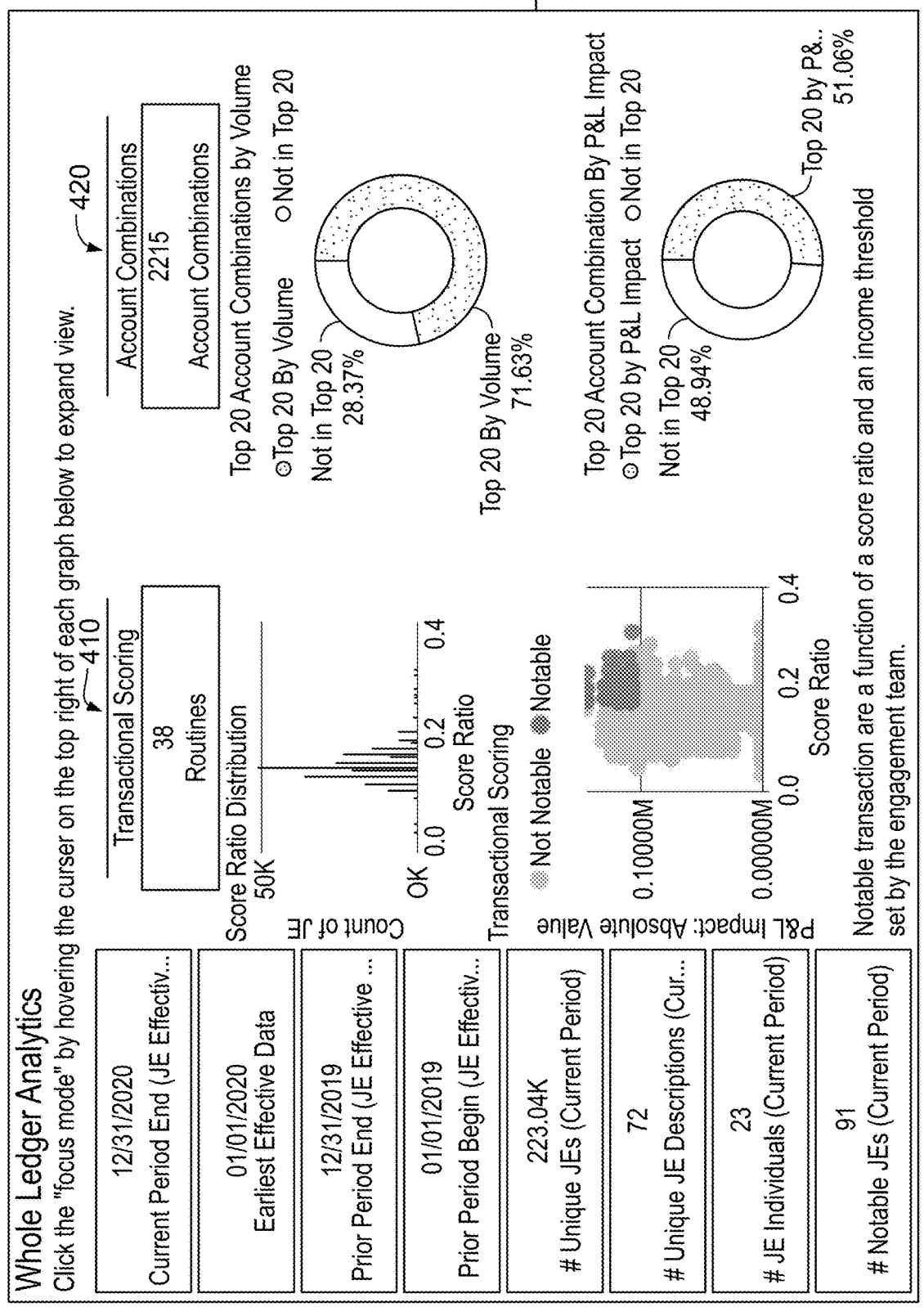
FIG. 4 is a diagram of an example user interface for general ledger analysis, according to an embodiment.
Figure 4:
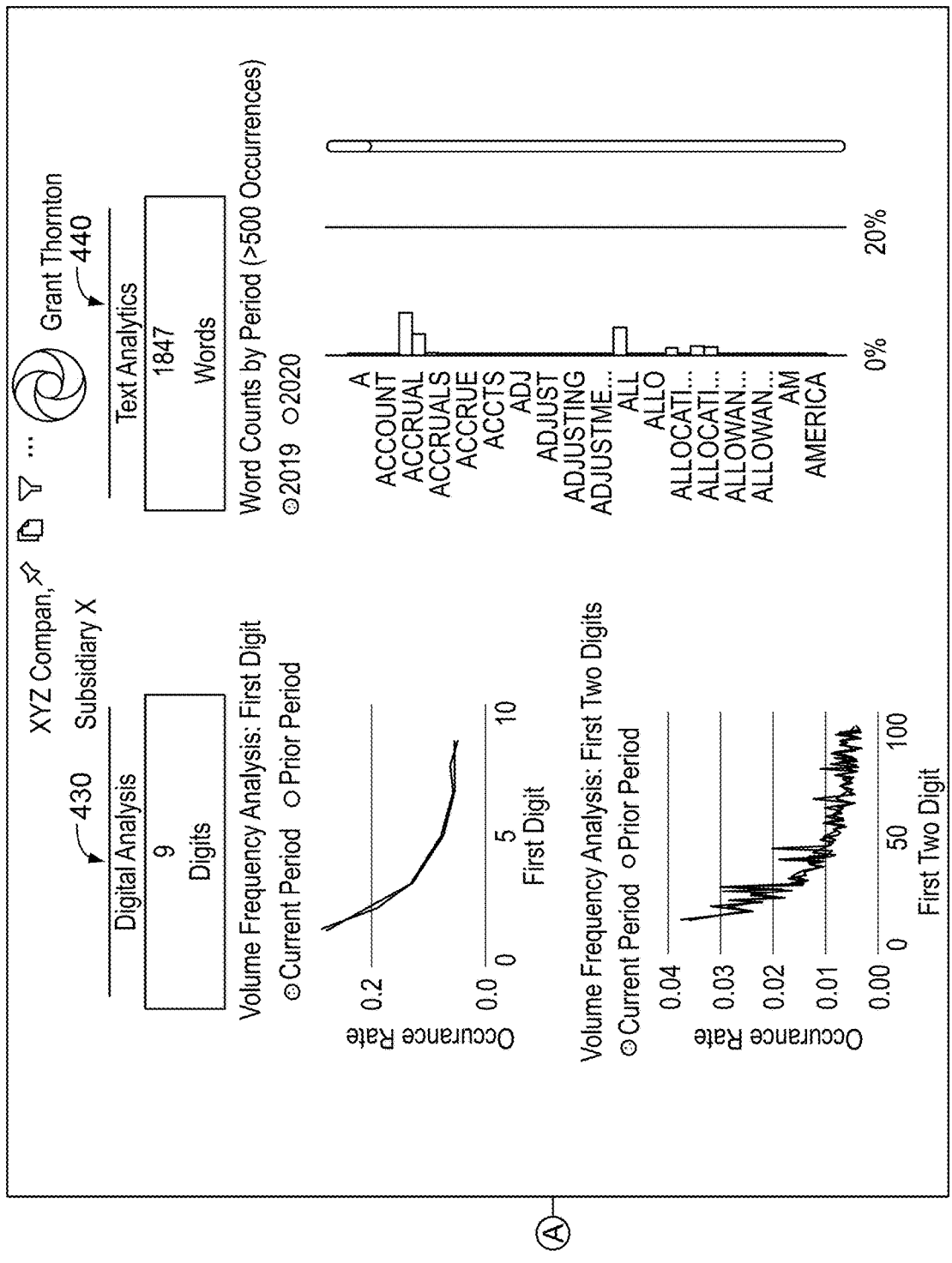

FIG. 4 is a diagram of an example user interface 400 for general ledger analysis, according to an embodiment. The user interface 400 provides one or more reports about the transaction lines and journal entries of the general ledger, for example, one or more of a transactional scoring report 410, an account combination report 420, a digit analysis report 430, and a text analysis report 440, in various embodiments. In other embodiments, additional reports may be added to or removed from the user interface 400.

In some embodiments, at least some of the assessment routines 258 support a transactional scoring process where each journal entry is processed using a series of analytical routines designed to identify specific characteristics of potential fraud. In some scenarios, this approach analyzes every transaction line in the general ledger (as opposed to only a subset of lines) to determine whether the transaction line meets the corresponding flagging threshold. The processor then scores each journal entry based on a composite score (e.g., summation, weighted average, or other suitable combination) of the scores of every journal entry line across all assessment routines. Journal entries that exhibit elevated scores may represent entries with heightened risk of material misstatement due to fraud, including fraud related to management override of controls.

The composite score is a function of a plurality of separate assessment routines, with each routine configured to identify a different risk element or group of risk elements. Examples of risk elements include large currency amounts, round numbers for currency amounts, transactions that occur on weekends, transactions that occur close to approval thresholds (i.e., just under a threshold), transactions with unusual volume or size as compared to other periods, etc. In some scenarios, a composite risk score is determined based on high risk trends and characteristics within the general ledger data. In some scenarios, risk elements also include transactions for an account (or combination of accounts) by a user, where those accounts are not usually accessed by the user.

In the embodiment shown in FIG. 4, the transactional scoring report 410 indicates a number of the plurality of assessment routines 258 (i.e., 38 separate assessment routines may be executed), a score ratio distribution, and a distribution of score ratios by impact on the ledger. In more detail, different assessment routines are run on the individual transaction lines of the general ledger and the number of actual assessment hits is determined for each journal entry. In some embodiments, an assessment routine score or "base score" is determined for a particular routine as the product of the number of assessments (i.e., a number of lines that meet the assessment's criteria) and a weighting value. The weighting could be equal for the routines, for example, 1 divided by the number of routines (e.g., 0.025 for 40 routines), but the weighting can also be changed to promote (e.g., 0.030), demote (e.g., 0.020), or eliminate a routine (e.g., 0.0). In some embodiments, promotion or demotion is limited to a selection of predetermined weighting values, for example, corresponding to a "high" or "low" importance (e.g., 0.04 for high and 0.02 for low). In other embodiments, different levels of weighting values are used, for example, corresponding to "extreme" (0.05), "high" (0.04), "moderate" (0.03), "low" (0.02), and "background" (0.01). In some scenarios, the weighting values are adjusted based on characteristics of a business, the corresponding industry, or other criteria. For example, banks that must meet a particular set of banking regulations may have increased weights on routines that evaluate compliance with those regulations.

A composite score for a journal entry is determined as the sum of the assessment routine scores and can be used to identify high risk entries. In some embodiments, the maximum score for a transaction line is 1.0 (assuming that the weighting values are set to sum to 1) and the maximum possible composite score is then equal to the number of transaction lines. The maximum potential assessment hits for a journal entry is determined as the product of the number of transaction lines and the number of assessment routines.

Figure 5:
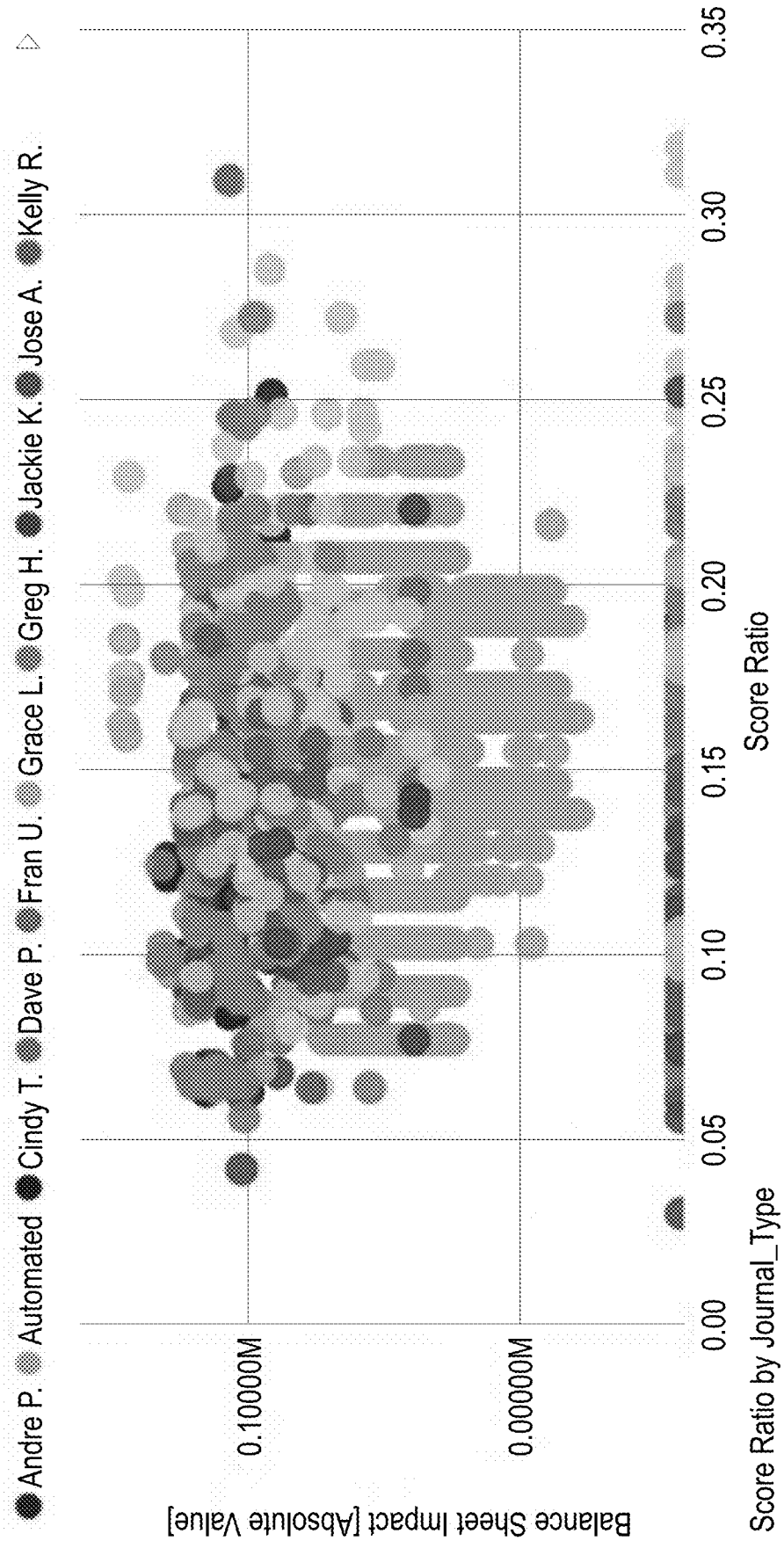
FIG. 5 is a diagram of another example user interface for general ledger analysis using a risk score ratio, according to an embodiment.

FIG. 5 is a diagram of another example user interface 500 for general ledger analysis using a risk score ratio, according to an embodiment. In various embodiments, the user interface 500 is a report generated by the data analytics processor 250, the on-site data processor 112, and/or the off-site data processor 122. The score ratio for each journal entry is generated as the composite score divided by the number of lines for the journal entry. The Score Ratio helps to identify journal entries that are "more risky" even though they have a lower composite score. These risk scores are then coupled with information regarding the impact of the respective journal entry on the income statement and/or balance sheet. These two factors flag situations that allow auditors to focus their attention on entries that appear relatively risky and relatively important to the financial reporting period, improving the usability of both the data stored in the general ledger and the computer used to analyze the data. Transactional scoring can also be summarized by the user who posted the entry, the date or time of an entry, the company code, classes of transactions, and various other fields in order to customize the auditor's risk assessment. Further details on the generation of FIG. 5 are described below with respect to FIGS. 10 and 11. In some embodiments, the transactional scoring summary is summarized by user to highlight particular users that may have unusual transaction histories, for example, a history of entering transactions that only utilize three accounts, followed by several transactions that utilize a fourth account that had not been previously accessed by the user.

Transactional scoring and the generated score ratio provide a more detailed analysis of the general ledger in that many different criteria are combined so that a large number of "moderate" range scores that, in the aggregate, represent a high level of risk, are effectively highlighted to an auditor via a graphical user interface. In other words, a journal entry having 15 moderate scores from assessment routines may be ranked higher (i.e., higher risk) than a journal entry having seven high scores from assessment routines. Accordingly, the score ratio represents a more accurate basis for comparison of journal entries, as opposed to a simple summation of raw scores from assessment routines. In some scenarios, a user that intends to conceal a fraudulent transaction from review by using transaction values that are less than known audit thresholds may be identified through analysis of these moderate range scores. For example, where a user enters a series of fraudulent transactions that are each less than $5,000 to avoid an audit threshold set at $5,000, the transactional scoring approach may flag multiple entries just under this threshold.

In some embodiments, an average risk score is determined for a general ledger and those journal entries scoring two standard deviations above that average are highlighted. In an embodiment, the threshold for highlighting a journal entry is adjustable by a user to higher or lower values. Users may also opt to exclude automated journal entries, to score on income statement or balance sheet impact, to exclude amounts below a certain dollar value, etc. In some embodiments, the base score and/or composite score is further weighted based on a value or significance of the transaction line (i.e., $4 or $400). In some embodiments, the base score and/or composite score is weighted based on a source of a transaction line, for example, the account number 314 or account description 316. As an example, the base score may be increased by a weighted value when a source for a transaction is a credit account. In other embodiments, the base score and/or composite score is weighted based on a destination of a transaction line, for example, when an account number for a credit is an employee's payroll direct deposit account, a new account that has not been previously seen by the data analytics system 200, etc.

In some embodiments, the analytical functions 258 include an account combination function configured to identify groups of accounts (i.e., at least two accounts) within a general ledger or other suitable set of data and sort, arrange, or flag those groups on a graphical user interface or audit report. In an embodiment, for example, journal entries of a company's general ledger are grouped into unique combinations of debit accounts and credit accounts. As an example, each journal entry having the same debit account and the same credit account are grouped together for further analysis. Each combination of accounts may be flagged as either unique to a prior period, unique to a current period, or appearing in both the prior and current periods.

FIG. 6 is a diagram of an example user interface 600 for general ledger analysis using account combinations, according to an embodiment. The user interface 600 provides insight into the available account combinations and their impact on the overall ledger. For example, the user interface 600 indicates a number of transaction lines within the general ledger and indicates a "top 20" of the combinations in the general ledger. With reference to FIG. 3, the journal entry 1002 generally corresponds to an account combination of Bank One and Bank Two, while the journal entry 1005 generally corresponds to an account combination of Accounts Receivable and MSK Direct Deposit. In some embodiments, the account combination represents a sequence of the transactions indicated by a journal entry.

Figure 7:
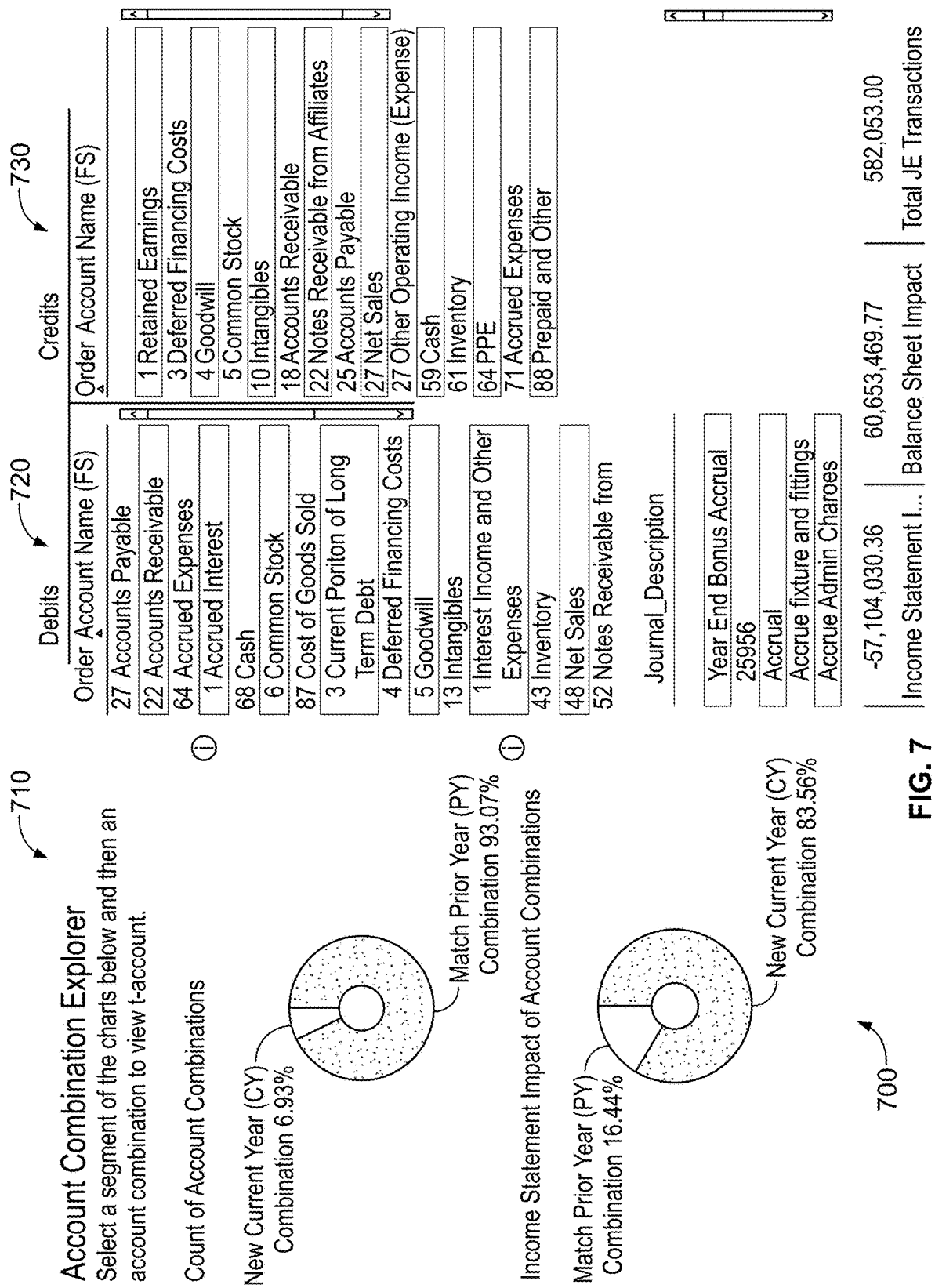
FIG. 7 is a diagram of another example user interface for general ledger analysis using account combinations, according to an embodiment.

FIG. 7 is a diagram of another example user interface 700 for general ledger analysis using account combinations, according to an embodiment. In the user interface 700, account combinations are readily displayed using an account combination explorer 710, which provides a pie chart indicating respective values of the account combinations in the general ledger. The user interface 700 also provides a visual listing of debit accounts 720 and credit accounts 730, which helps to highlight frequently used accounts.

In some scenarios, the combinations are arranged based on income statement impact or balance sheet impact. In other scenarios, the combinations are grouped by affected accounts, e.g. revenue. The most common combinations and trends of the combinations can then be plotted or trended year over year, using the company's own data as the baseline. Advantageously, a display of impactful combinations (e.g., a top 20 account combinations) provides a helpful insight into the key accounts when analyzing a new business to understand the foundation of financial reporting quickly.

In some scenarios, combinations that meet a value threshold (e.g., 20% of revenue) are selected for further analysis, for example, analysis using transactional scoring routines that evaluate risk or fraud associated with significant account combinations. In some embodiments, the user interface 700 identifies the top twenty account combinations by volume, number of occurrences, associated business units or users, or other suitable criteria. In another embodiment, a graphical user interface is generated that identifies the top twenty account combinations by profit and loss statement impact.

Figure 8:
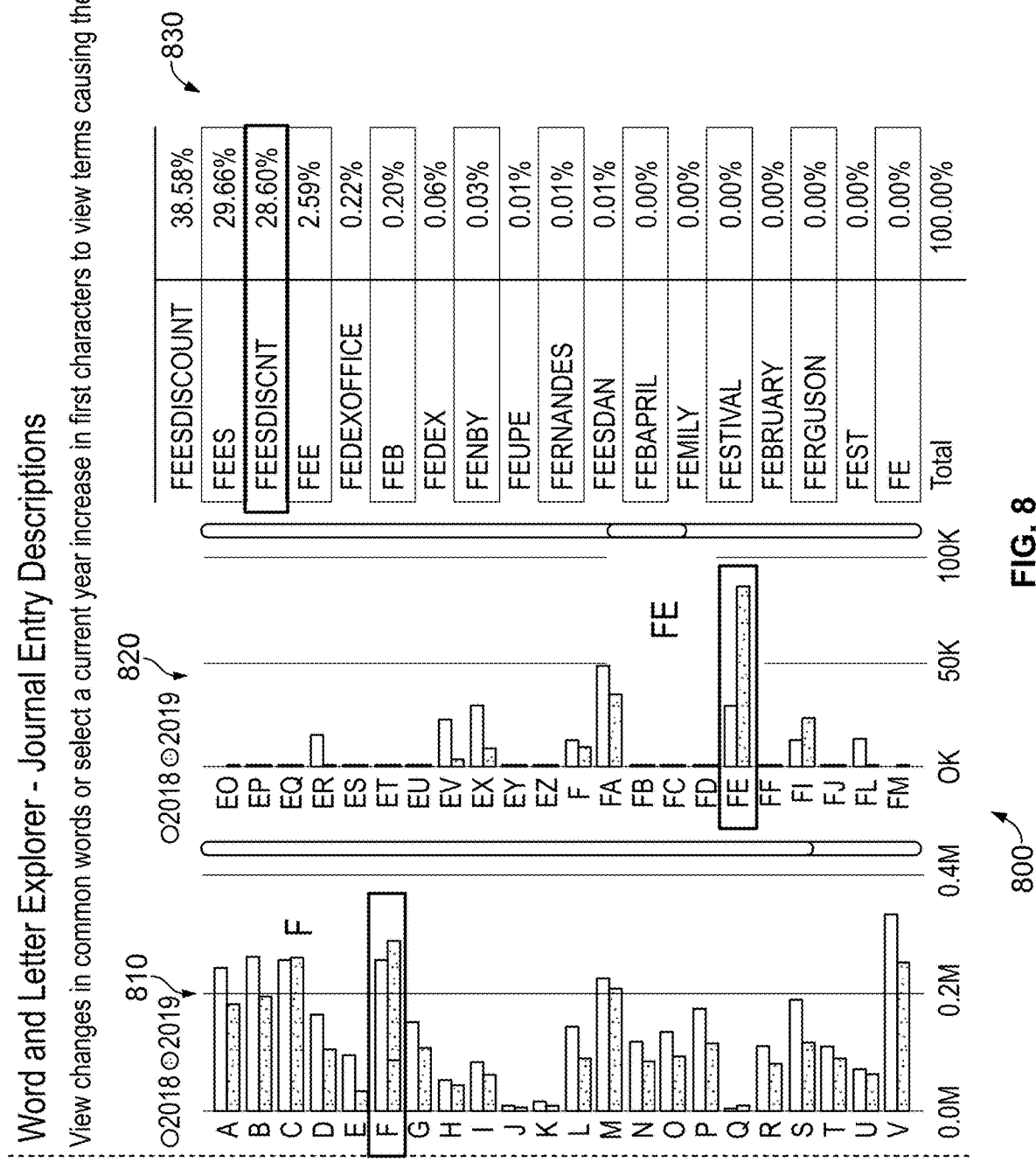
FIG. 8 is a diagram of an example user interface for general ledger analysis using digit and text analysis, according to an embodiment.

FIG. 8 is a diagram of an example user interface 800 for general ledger analysis using digit and text analysis, according to an embodiment. In some embodiments, the analytical functions are configured to analyze a general ledger based on words used within the general ledger, not just the numbers in the transactions of the ledger. Within a general ledger, the same words tend to occur year over year, so changes may indicate some change in operations of the business that could affect risk assessment. However, the context of those changes is important to recognize risk. In an embodiment, the analysis of the words is compared to the company's own data to provide an appropriate context for a "normal" baseline. Analysis of the words and numbers can be performed on a line entry level and/or journal entry level.

The general ledger includes journal entries that each include one or more character strings (e.g. in a journal entry description and the corresponding amount for the entry). In some embodiments, only a subset of each character string is analyzed in order to group similar journal entries together. The subset could be the first character as shown in groups 810, first two characters as shown in groups 820, the last two characters, or some other subset and the character string is generally numbers, letters, or combinations of letters and numbers, so the groups could be AA, AB, AC, etc. as one example, or 00, 01, 02, etc. as another example. A first set of frequencies of occurrence is determined for the groups over a first time period under review (e.g., over one year or one quarter) and will be trended against a reference period (e.g., the preceding period) if available, with each frequency of occurrence corresponding to a different group of characters. Trends in the frequencies for each group are identified using the preceding period as a baseline. If analyzing a full current year and the prior year is not available, quarters within the current year can be used to provide a baseline for the other quarters in the same year. In this way, a company's own data is used as the baseline, instead of simply using Benford's law for example as it applies to natural data sets. Natural law does not manifest in words and letters the way it does in numbers and digits, but this unique approach creates a context for words and letters for each company where it otherwise wouldn't exist. After the frequency trends are identified, specific groups are automatically highlighted in a graphical user interface at suitable threshold frequencies (e.g., 20% more occurrences). A user can then select a group for further analysis and display the words (or numbers, billing codes, etc.) within the corresponding line items that cause the frequency changes. For example, where the group "FE" meets the threshold, individual words are analyzed for occurrences in group 830, for example, FedEx, Federal, Fee, FeeDiscount. Those words that meet an additional threshold are highlighted in the graphical user interface for further review by a user.

In an example graphical user interface shown in FIG. 8, single and dual character sub-strings are shown for a first time period (2018) and a second time period (2019). Selection of a single character sub-string (i.e., "F") from the group 810 by a user causes the processor 252 to automatically identify or highlight the corresponding dual character sub-strings (i.e., FA, FB, FC, etc.). Selection of the dual character string by a user causes the processor to show the corresponding words. For example, upon selection of "FE" from group 820, the processor shows a list of corresponding words (or codes): FEEDISCOUNT, FEES, FEESDSCNT, etc. and their respective changes in occurrence from 2018 to 2019.

In a similar manner, substrings of numbers for journal entries or lines may be analyzed. For example, a journal entry with a value of $12,000,000 may be grouped with other entries beginning with "12."

In some embodiments, the character subset analytics are performed on account combinations that have been flagged or highlighted for other reasons. For example, a recurring account combination could be analyzed for changes in the character strings. As another example, trending keywords or character strings (i.e., those having increased occurrences) could be analyzed to highlight which account combinations use those keywords.

In some embodiments, the character subset analytics are performed on accounts or account combinations identified by a transactional scoring system that identifies those accounts meeting one or more risk-associated criteria.

Figure 9:
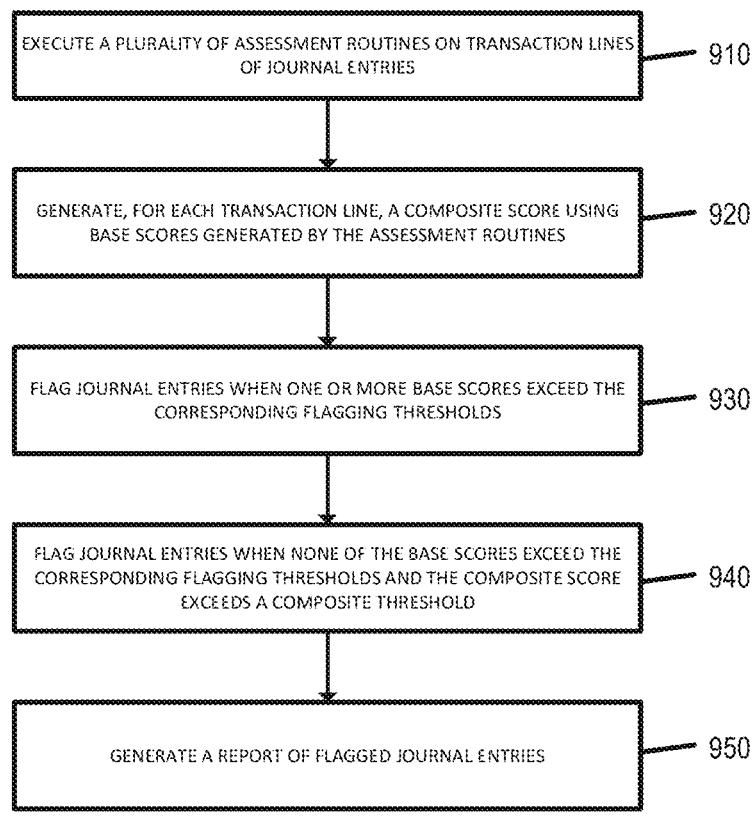
FIG. 9 is a flow diagram of an example method for flagging journal entries within a general ledger, according to an embodiment.

FIG. 9 is a flow diagram illustrating an example method 900 for flagging journal entries within a general ledger, according to an embodiment. In an embodiment, the method 900 is implemented by a computing device, according to an embodiment. With reference to FIG. 1, the method 900 is implemented by the on-site data processor 112 or the off-site data processor 122, in some embodiments. In another embodiment, for example, the computing device that implements the method 900 corresponds to the processor 252 of the data analytics function processor 250.

At block 910, a plurality of assessment routines are executed on transaction lines of the journal entries within the general ledger, in an embodiment. Each assessment routine of the plurality of assessment routines is configured to generate a base score for each transaction line. Moreover, each assessment routine is associated with a corresponding flagging threshold. The plurality of assessment routines generally correspond to the analytical functions 258, in some embodiments. The plurality of assessment routines generate base scores that identify audit risk for the general ledger.

At block 920, for each transaction line, a composite score is generated using the base scores generated by the plurality of assessment routines.

At block 930, for each journal entry within the general ledger, the journal entry is flagged when one or more base scores for the journal entry exceed the corresponding flagging thresholds of the assessment routines. In an embodiment, when the journal entry is flagged, each transaction line of the journal entry is flagged, even when the base score of the transaction line does not exceed any of the flagging thresholds, based on its inclusion in a journal entry that has been flagged. In various embodiments, the flagging threshold is one standard deviation, two standard deviations, or other suitable threshold value.

At block 940, for each journal entry within the general ledger, the journal entry is flagged when none of the base scores for the journal entry exceed the corresponding flagging thresholds and the composite score exceeds a composite threshold.

At block 950, a report of flagged journal entries is generated. In some embodiments, the report corresponds to the user interface 400, 500, 600, 700, or 800. In an embodiment, generating the report includes grouping the flagged journal entries according to corresponding transaction pairs of credit accounts and debit accounts for the transaction lines of the journal entries within the general ledger, and generating the report to rank the transaction pairs according to their combined composite scores. In some embodiments, this includes identifying the transaction pairs as one of a unique pair, a recurring pair, and a non-recurring pair in the generated report. The unique pair is an account combination that occurs only once in the general ledger. The recurring pair is an account combination that occurs somewhat regularly, for example, once or twice a month (e.g., a payroll related account combination), several times per week, or over other suitable periods. The non-recurring pair occurs infrequently and as such, may be more likely to indicate transactional risk. In an embodiment, combined composite scores are weighted differently according to different weights that correspond to the identified pairs. For example, a non-recurring pair may be weighted to increase its likelihood of being flagged for further review. In some embodiments, unique pairs are flagged when a total journal entry credit or debit meets a unique pair threshold (e.g., a composite score of 5 or more). In this way, a unique pair that is highly scored by the assessment routines is flagged because of a higher chance of being a "one off" entry for management override. Although recurring pairs may also have high scores from the assessments, they may simply be automated or standard accounting entries occurring multiple times in a year. In an embodiment, the account combinations are displayed with their identification as unique, recurring, or non-recurring along with their respective scores (i.e., composite scores and score ratios), which allows an auditor to use their discretion to flag entries for further review.

In some embodiments, grouping the flagged journal entries includes sub-dividing the groups according to a predetermined time period, for example, grouping the recurring pairs according to their recurrence (e.g., weekly, monthly, etc.). In an embodiment, a trendline is generated over a plurality of successive predetermined time periods that includes the predetermined time period.

In an embodiment, for each journal entry that contains a plurality of transaction lines, a journal entry total score is generated based on corresponding composite scores of the plurality of transaction lines. Moreover, a journal entry is flagged when the journal entry total score divided by a number of the plurality of transaction lines exceeds a score ratio threshold. In various embodiments, the score ratio threshold corresponds to one standard deviation, two standard deviations, or other suitable threshold value. In other embodiments, the score ratio threshold is a fixed value (e.g., 0.5, 0.75) that may be adjusted by a user.

The method 900 may further include selecting a subset of characters from each of the plurality of journal entries. The plurality of journal entries may be grouped according to the subset of characters and trends may be identified in the groups of journal entries by comparing a number of occurrences of the groups among a plurality of reporting periods. Ones of the groups of journal entries that meet a trending threshold are then flagged.

Figure 10:
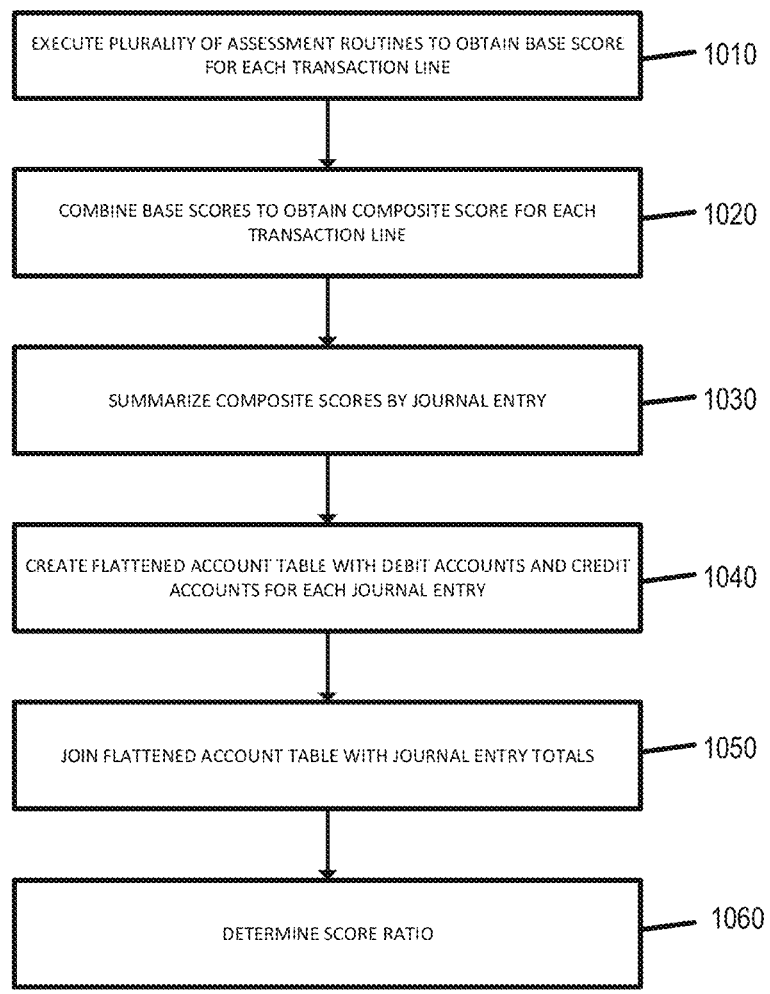
FIG. 10 is a flow diagram illustrating another example method for flagging journal entries within a general ledger, according to an embodiment.

FIG. 10 is a flow diagram illustrating an example method 1000 for flagging journal entries within a general ledger, according to an embodiment. FIG. 11 and FIG. 12 depict several tables illustrating features of the method 1000, using general ledger 300 (FIG. 3) as example source material. In an embodiment, the method 1000 is implemented by a computing device, according to an embodiment. With reference to FIG. 1, the method 1000 is implemented by the on-site data processor 112 or the off-site data processor 122, in some embodiments. In another embodiment, for example, the computing device that implements the method 1000 corresponds to the processor 252 of the data analytics function processor 250.

At block 1010, a plurality of assessment routines are executed to obtain base scores for each transaction line of a general ledger for each of the assessment routines. In the embodiment shown in FIG. 11, a composite score table 1150 includes a list of journal entries with individual transaction lines and base scores for four assessment routines AR1, AR2, AR3, and AR4. For example, a first transaction line of journal entry 1003 shows that it has been flagged by three assessment routines AR1, AR3, and AR4, while a second transaction line of journal entry 1003 has been flagged by only the first assessment routine AR1. Moreover, journal entry 1003 has been flagged twice by assessment routine AR1, once by assessment routine AR2, once by assessment routine AR3, and twice by assessment routine AR4, which results in base scores of 2, 1, 1, and 2 for the assessment routines AR1, AR2, AR3, and AR4, respectively. Although only four assessment routines are shown in FIG. 11 for clarity, in other embodiments, the plurality of assessment routines may include ten, fifty, one hundred, or more assessment routines. In some embodiments, a user may "deactivate" one or more of the assessment routines to avoid their further use in a particular audit. For example, a user may deactivate an assessment routine that routinely flags a particular transaction line because of its characteristics, but which is known to be an acceptable recurring transaction by the user.

At block 1020, the base scores of the transaction lines are combined to obtain a composite score for each transaction line. In some embodiments, the base scores are combined by summing the scores. In composite score table 1150, the composite score for the first, second, and third lines of the journal entry 1003 are 3, 1, and 2, respectively. In other embodiments, respective weighting values are used for each assessment routine. For example, in some scenarios, a user selects a high weight value (e.g., 1.8 or 2.0) to emphasize a particular assessment routine, or selects a low weight value (e.g., 0.3 or 0.5) to de-emphasize a particular assessment routine. In some examples, a weight value of zero is selected to omit results for an assessment routine. This approach allows customizability for particular audits based on client requests or auditor experience.

At block 1030, the composite scores are summarized by journal entry to obtain a journal entry total. For example, the composite scores of journal entry 1003 (3, 1, and 2) are added together for a journal entry total of 6, while the journal entry total of journal entry 1005 is 5. In some embodiments, composite scores of particular transaction lines are weighted before adding, for example, to emphasize a particular transaction that utilizes or establishes a credit line that incurs interest (as opposed to simply reducing a cash account).

At block 1040, a new flattened account table 1100 is created from the general ledger 300 that "flattens" the separate transaction lines for each journal entry into a single line. In other words, where two, three, or more lines are used to show a "sequence" of transactions within a journal entry, the sequence of the journal entry is shown by separate columns in the flattened account table 1100 within a single row. In the embodiment shown in FIG. 11, each transaction line in a sequence according to a journal entry number 1102 is represented by an account cluster that utilizes three separate columns: an account number 1104, 1110, and 1116, a debit 1106, 1112, and 1118 from the account indicated by the account number, and a credit 1108, 1114, and 1120 to the account indicated by the account number. In examples where only a debit is performed, the credit is left blank for that account cluster. Similarly, for examples where only a credit is performed, the debit is left blank for that account number. Although only three account clusters are shown in FIG. 11, in some embodiments 20, 50, or more account clusters are included in the flattened account table 1100.

In the embodiment shown in FIG. 11, the representation of the journal entry 1002 from the general ledger 300 includes a first cluster having a debit of $5,000 from the account number 1001001 (with a blank credit), followed by a second cluster having a credit to the account number 2002002 (with a blank debit), with remaining clusters left blank. In a similar manner, the representation of the journal entry 1003 from the general ledger 300 includes a first cluster having a debit of $12,000 from the account number 3003003, a credit of $13,000 to the account number 4004004, and a debit of $1,000 from the account number 5005005.

At block 1050, the flattened account table 1100 is joined with the journal entry totals from the composite score table 1150. In the embodiment shown in FIG. 12, for example, the account numbers for the journal entries, base scores for each of the plurality of assessment routines, corresponding journal entry totals, a total number of line items for a journal entry, and score ratios are combined into a score ratio table 1200. The score ratio table 1200 includes a journal entry number 1210, account numbers 1220, 1222, and 1224 in sequence, the base scores 1230, 1232, 1234, and 1236 for each of assessment routines AR1, AR2, AR3, and AR4, the journal entry total 1240, the total number of line items 1250, and a score ratio 1260.

At block 1060, the score ratio 1260 for each journal entry is determined according to a journal entry total 1240 divided by a maximum possible score. The maximum possible score is a product value of a total number of the plurality of assessment routines multiplied by the total number of transaction lines 1250 for a journal entry. As shown in FIG. 12, the score ratio 1260 for the journal entry 1003 is the journal entry total 1240 of 6 divided by the maximum possible score of 12 (4 assessment routines with base scores of "1" times 3 transaction line items). Similarly, the score ratio 1260 for the journal entry 1005 is the journal entry total 1240 of 5 divided by the maximum possible score of 8 (4 assessment routines with base scores of "1" times 2 transaction line items). In other embodiments, the maximum possible score is a product value of the total number of transaction lines 1250 for a journal entry multiplied by a total of the maximum base scores of the plurality of assessment routines. For example, four transaction lines of a journal entry multiplied by seven assessment routines each having a maximum base score of 10 corresponds to a maximum possible score of 280.

With respect to score ratio table 1200, further enhancement of the representation of the data is provided, in some embodiments, by summarizing the data by the values within the account numbers 1104, 1110, and 1116 in their sequence. For example, journal entry 1002 and journal entry 1004 may be combined because they have the same values for each of the account numbers 1104, 1110, and 1116 in sequence. In some embodiments, the score ratios 1260 are plotted based on a balance sheet impact and visually distinguished by a user that entered in the transactions resulting in the score ratio, as shown in FIG. 5.

In some embodiments, an average score is calculated for each class of transactions (e.g. cash, accounts receivable, revenue, or other account description 316) based on the summation of the scores of every journal entry line tagged to that transactional grouping. Classes of transactions that exhibit elevated scores may represent a heighted risk of a material misstatement. The average risk score calculated for each class of transactions provides a baseline of risk for that class of transactions.

The score ratio table 1200 includes new data generated by the data analytics function processor 250 (i.e., score ratios) that provides an integration of scoring of individual transactions with key sequences that occur within a particular organization to provide additional insights that are not readily apparent from the general ledger data. In some embodiments, increasing a dimensionality of generated data by evaluating not just a risk score ratio but also a significance (i.e. value) and nature (i.e. the user that creates the journal entry) of a journal entry allows for improved usability of a computing device that implements the data analytics function processor 250, specifically, more accurate flagging and determinations of whether any activity by a user may warrant additional investigation. For example, journal entries 1003 and 1005 are linked both by their user ("MSK") and high score ratios (0.5 and 0.63). Knowing which accounts, and more specifically the combination or sequence of accounts, were used to record a journal entry may provide insight as to why a journal entry corresponds to a high risk score. For example, a company may record certain recurring journal entries at comparatively large values or lower frequencies (e.g. a quarterly accrual or adjustment to an estimate) which causes those entries to obtain a high risk score due to many of the assessment routines flagging instances of unusual value, volume, and/or timing; however, upon evaluating the general ledger accounts associated within the related entry, a user may determine not to further investigate the entry (despite it possessing a high value and risk score) as the account pattern falls within the expectations of the user for the types of entries the company should record. As such, account combinations provide additional context to better evaluate the generated score ratios and which journal entries may or may not warrant additional investigation and further procedures.

Figure 13:
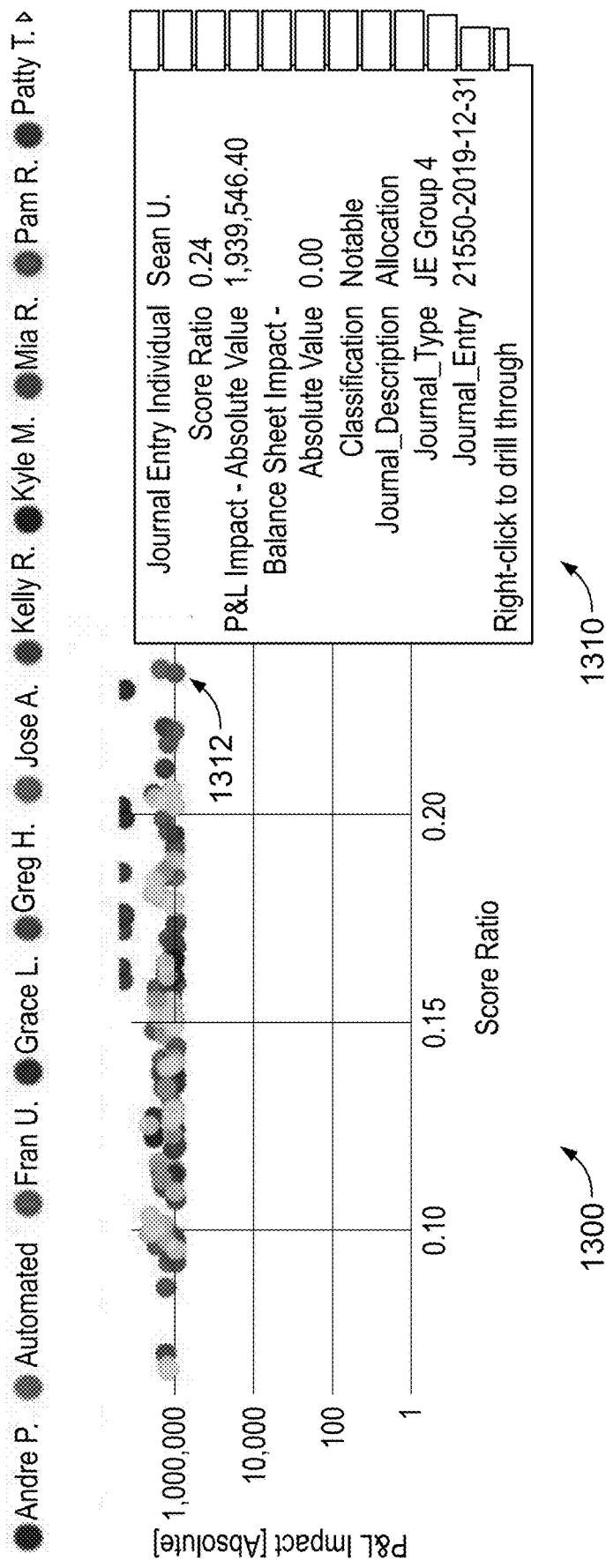
FIG. 13 is a diagram of another example user interface for general ledger analysis using a risk score ratio, according to an embodiment.

FIG. 13 is a diagram of another example user interface 1300 for general ledger analysis using a risk score ratio, according to an embodiment. In various embodiments, the user interface 1300 is a report generated by the data analytics processor 250, the on-site data processor 112, and/or the off-site data processor 122. The user interface 1300 is a scatter plot configured to display identifiers for journal entries and provide more detailed information for selected journal entries. In FIG. 13, individual plot points (circles) represent different journal entries according to their generated score ratios (e.g., score ratio 1260) along the x-axis and an absolute value of a profit and loss impact (e.g., a maximum value of the total journal entry debit 304 or credit 306) along the y-axis. In some embodiments, each plot point has a display color that indicates a user that entered the corresponding journal entry.

By generating the score ratios from the general ledger and then displaying individual journal entries according to their score ratio, the user interface 1300 provides improved visual access to journal entries that have higher risk and higher influence on the financial well-being of a business and improved accuracy of an audit analysis or other review of the general ledger. Specifically, journal entries with higher risk (higher score ratio) and higher influence (impact) are generally shown in an upper right quadrant of the user interface 1300. Moreover, the plot points may be colored differently for different users so that entries by a particular user that are visibly distant from their usual entries (i.e., outliers from their usual cluster of entries) are readily identified by the separation of their colored plot points. The display of journal entries by score ratio by the user interface 1300 enables more accurate flagging of journal entries, and subsequent, focused analysis on those flagged entries, which would otherwise be missed without a more detailed and time-consuming analysis of every journal entry using traditional user interfaces. Moreover, journal entries with many line items are effectively compared to journal entries with fewer line items because the score ratio accounts for the different numbers of line items. For example, a first journal entry with a journal entry total of 36 may, at first glance, appear to be more risky than a second journal entry with a journal entry total of 12. However, when the first journal entry has twelve lines and the second journal entry has two lines, a score ratio of 3 for the first journal entry indicates a lower relative risk compared to a score ratio of 6 for the second journal entry.

Since some audit reviews are time- or budget-limited, improved access to higher risk journal entries provided by the user interface 1300 based on the score ratio increases the accuracy, efficiency, and effectiveness of the audit review as compared to traditional user interfaces, which may list only base scores of a general ledger having thousands of entries. For example, the user interface 1300 displays journal entries such as the journal entry 1005 (with a journal entry total of 5) at a higher rank of risk than journal entries such as the journal entry 1003 (with a journal entry total of 6) due to the higher score ratio of the journal entry 1005.

As discussed above, the data analytics processor 250 may flag certain journal entries based on various thresholds for scores or score ratios that have been exceeded. In some embodiments, the user interface 1300 utilizes different visual identifiers to distinguish flagged journal entries, for example, different colors, shapes, flashes or animations, etc. In the embodiment shown in FIG. 13, the user interface 1300 is configured to provide a summary 1310 of a journal entry 1312 selected by a user. For example, the journal entry 1312 has one of the highest score ratios of those journal entries shown in the scatter plot, so the user may interact with the user interface 1300 to select the journal entry 1312 (e.g., by clicking, mouse-hovering, etc.) for further information. The summary 1310 may indicate one or more characteristics of the journal entry 1312, such as a user that entered in the transactions (Journal Entry Individual), a generated score ratio, a profits and loss impact, a balance sheet impact, a risk classification, a journal description (e.g., reference 308), a journal type, and a journal entry identifier. In other embodiments, the summary 1310 may include additional information to aid the user in evaluating the journal entry 1312 for risk. In some embodiments, the journal type corresponds to a particular sequence of accounts for a journal entry (e.g., a single value of the journal type may identify journal entries affecting the same accounts, such as journal entries 1002 and 1004). Further analysis of a high risk journal entry may be provided from the summary 1310 (i.e., by clicking on the summary 1310), for example, by linking directly to the relevant lines of flattened account table 1100, composite score table 1150, score ratio table 1200, or another suitable display of data.

By providing the user interface 1300 to the user (e.g., an auditor), with journal entries more accurately displayed according to their generated score ratio and thus their level of risk relative to other journal entries entered by a particular user, the auditor's interaction with the user interface 1300 is improved and allows for faster access to a particular high risk journal entry, via the summary 1310. The improved accuracy in the display and improved access to high risk journal entries is particularly helpful for audits performed by third party auditors or those new to the review of a general ledger, who may not have experience with journal entries of a particular business under audit or review (e.g., which journal entries are routine and which journal entries are unusual). Specifically, the generated score ratio reduces the number of journal entries that an auditor would normally review before being able to review a high risk journal entry having a high score ratio 1260, but low journal entry total 1240, particularly when the journal entries have different numbers of transaction lines.

Although various assessment routines have been described above, many other routines are within the scope of the present disclosure.

In an embodiment, an assessment routine is configured to summarize debit and credit volume activity for a current reporting period (e.g., financial quarter or year) on the accounts and plot them relative to a prior reporting period to identify period over period standard deviation differences (as set by the user) in the absolute value of each the debit and credit values. In this way, instead of focusing merely on an absolute value of the transactions, this routine focuses on statistical deviations of volume patterns in general ledger activity.

Another assessment routine may summarize journal entry activity on an amount field (e.g., line debit 318 or line credit 320) to identify the most common recurring dollar amounts (e.g., top 10 or top 20 amounts) and extract all journal entries that contain one of these recurring dollar amounts. While a Benford's Law or digital analysis focuses primarily on the first two digits of numbers to select deviations, this approach focuses solely on the amounts and highly recurring amounts in the general ledger.

An assessment routine may be configured to identify and compare the first and second largest dollar amounts individually recorded in a journal entry for all accounts. For example, the routine may extract entries where the largest dollar amount is five times greater than the second largest amount recorded, where there is at least a certain value posted to the account (e.g., a journal entry debit or credit of at least $10,000), and more than three journal entry transactions (or another suitable threshold) recorded to the account. While amount postings work on averages and standard deviations between timeframes, this approach focuses on the top differences in amounts within an account itself. The largest value is related to the next largest value to identify its relative size within the account.

Another assessment routine may be configured to extract journal entries that are below a management approval limit (e.g., within the range of 0%-5% below an approval limit). This routine focuses on controls and limits within an organization around journal entry approvals, which is not commonly utilized in transactional scoring of journal entries. This routine allows for two management approval limits to be utilized: a first limit that may be known to users that enter transactions into the general ledger, and a second limit that may be unknown to those users. In some scenarios, for example, journal entry 1005 where a transaction amount of $999.99 may be just under a first limit of $1,000, this routine identifies the journal entry as a higher risk for intentional circumvention of scrutiny from the first limit.

Other assessment routines may be configured to extract journal entry line items with duplicate credits and/or duplicate debits to expense related accounts and/or revenue related accounts. In some scenarios, duplication of journal entries corresponds to a higher risk for fraud or mistake. Still other assessment routines may be configured to flag journal entries having out of balance transactions, round dollar values, transaction values ending in 99 (e.g., $599), or transactions that were completed at unusual times.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A computer implemented method for flagging journal entries within a general ledger, the method comprising:

executing, by a processor using a computer readable memory, a plurality of assessment routines on transaction lines of the journal entries within the general ledger, each assessment routine of the plurality of assessment routines i) being configured to generate a base score for each transaction line, ii) associated with a corresponding flagging threshold, and iii) stored as computer readable instructions within the computer readable memory;

generating, by the processor and for each transaction line, a composite score using the base scores generated by the plurality of assessment routines;

for each journal entry within the general ledger:
flagging, by the processor, the journal entry when one or more base scores for the journal entry exceed the corresponding flagging thresholds of the assessment routines;
flagging, by the processor, the journal entry when none of the base scores for the journal entry exceed the corresponding flagging thresholds and the composite score exceeds a composite threshold;

generating, by the processor, a report of flagged journal entries, including at least one flagged journal entry where none of the base scores for the at least one flagged journal entry exceed the corresponding flagging thresholds and the composite score exceeds the composite threshold.

2. The computer implemented method of claim 1, wherein generating the report of flagged journal entries comprises:
grouping the flagged journal entries according to corresponding transaction pairs of credit accounts and debit accounts for the transaction lines of the journal entries within the general ledger;
generating the report to rank the transaction pairs according to their combined composite scores.

3. The computer implemented method of claim 2, wherein grouping the flagged journal entries according to the corresponding transaction pairs includes identifying the transaction pairs as one of a unique pair, a recurring pair, and a non-recurring pair in the generated report.

4. The computer implemented method of claim 3, wherein flagging the transaction pairs comprises weighting the combined composite scores differently according to different weights that correspond to the identified pairs.

5. The computer implemented method of claim 3, wherein grouping the flagged journal entries according to the corresponding transaction pairs further comprises sub-dividing the groups according to a predetermined time period.

6. The computer implemented method of claim 5, further comprising generating, by the processor, a trendline over a plurality of successive predetermined time periods that includes the predetermined time period.

7. The computer implemented method of claim 1, wherein the plurality of assessment routines generate base scores that identify audit risk for the general ledger.

8. The computer implemented method of claim 7, the method further comprising:
generating, by the processor and for each journal entry that contains a plurality of transaction lines, a journal entry total score based on corresponding composite scores of the plurality of transaction lines;
generating, by the processor, a score ratio as the journal entry total score divided by a product value of a total number of the plurality of assessment routines multiplied by the total number of transaction lines;
flagging, by the processor, a journal entry when the score ratio exceeds a score ratio threshold; and wherein generating the report of flagged journal entries comprises generating a plot of the flagged journal entries arranged by score ratios.

9. The computer implemented method of claim 1, wherein flagging the journal entry when the one or more base scores for the journal entry exceed the corresponding flagging thresholds of the assessment routines comprises flagging each transaction line of the journal entry.

10. The computer implemented method of claim 1, the method further comprising:
selecting, by the processor, a subset of characters from each of the plurality of journal entries;
grouping, by the processor, the plurality of journal entries according to the subset of characters;
identifying, by the processor, trends in the groups of journal entries by comparing a number of occurrences of the groups among a plurality of reporting periods; and
flagging, by the processor, ones of the groups of journal entries that meet a trending threshold.

11. A system comprising:
at least one processor, and
at least one memory storing computer-executable instructions that when executed by the at least one processor cause the system to:
execute a plurality of assessment routines on transaction lines of journal entries within a general ledger, each assessment routine of the plurality of assessment routines i) being configured to generate a base score for each transaction line, and ii) associated with a corresponding flagging threshold;
generate, for each transaction line, a composite score using the base scores generated by the plurality of assessment routines;
for each journal entry within the general ledger:
flag the journal entry when one or more base scores for the journal entry exceed the corresponding flagging thresholds of the assessment routines; and
flag the journal entry when none of the base scores for the journal entry exceed the corresponding flagging thresholds and the composite score exceeds a composite threshold; and
generate a report of flagged journal entries, including at least one flagged journal entry where none of the base scores for the at least one flagged journal entry exceed the corresponding flagging thresholds and the composite score exceeds the composite threshold.

12. The system of claim 11, wherein the computer-executable instructions cause the system to:
group the flagged journal entries according to corresponding transaction pairs of credit accounts and debit accounts for the transaction lines of the journal entries within the ledger;
generate the report to rank the transaction pairs according to their combined composite scores.

13. The system of claim 12, wherein the computer-executable instructions cause the system to identify the transaction pairs as one of a unique pair, a recurring pair, and a non-recurring pair in the generated report.

14. The system of claim 13, wherein the computer-executable instructions cause the system to weight the combined composite scores differently according to different weights that correspond to the identified pairs.

15. The system of claim 13, wherein the computer-executable instructions cause the system to sub-divide the groups according to a predetermined time period.

16. The system of claim 15, wherein the computer-executable instructions cause the system to generate a trendline over a plurality of successive predetermined time periods that includes the predetermined time period.

17. The system of claim 11, wherein the plurality of assessment routines generate base scores that identify audit risk for the general ledger.

18. The system of claim 17, wherein the computer-executable instructions cause the system to:
generate, for each journal entry that contains a plurality of transaction lines, a journal entry total score based on corresponding composite scores of the plurality of transaction lines;
generate a score ratio as the journal entry total score divided by a product value of a total number of the plurality of assessment routines multiplied by the total number of transaction lines;
flag a journal entry when the score ratio exceeds a score ratio threshold; and
generate a plot of the flagged journal entries arranged by score ratios.

19. The system of claim 11, wherein the computer-executable instructions cause the system to flag each transaction line of the journal entry.

20. The system of claim 11, wherein the computer-executable instructions cause the system to:
select a subset of characters from each of the plurality of journal entries;
group the plurality of journal entries according to the subset of characters;
identify trends in the groups of journal entries by comparing a number of occurrences of the groups among a plurality of reporting periods; and
flag ones of the groups of journal entries that meet a trending threshold.

* * * * *